US012401154B2

(12) United States Patent
Brillo

(10) Patent No.: US 12,401,154 B2
(45) Date of Patent: Aug. 26, 2025

(54) ASSEMBLY OF A PLUG-IN CONNECTOR PART, PLUG-IN CONNECTOR PART AND ELECTRONIC DEVICE

(71) Applicant: Phoenix Contact GmbH & Co. KG, Blomberg (DE)

(72) Inventor: Lukas Brillo, Hoexter (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 0 days.

(21) Appl. No.: 17/799,288

(22) PCT Filed: Feb. 10, 2021

(86) PCT No.: PCT/EP2021/053179

§ 371 (c)(1),
(2) Date: Aug. 12, 2022

(87) PCT Pub. No.: WO2021/160657

PCT Pub. Date: Aug. 9, 2021

(65) Prior Publication Data

US 2024/0186743 A1 Jun. 6, 2024

(30) Foreign Application Priority Data

Feb. 14, 2020 (DE) ..................... 10 2020 103 845.3

(51) Int. Cl.
*H01R 13/518* (2006.01)
*H01R 13/506* (2006.01)
(Continued)

(52) U.S. Cl.
CPC ......... *H01R 13/518* (2013.01); *H01R 13/506* (2013.01); *H01R 13/508* (2013.01); *H01R 13/639* (2013.01)

(58) Field of Classification Search
CPC .. H01R 13/639; H01R 13/508; H01R 13/518; H01R 13/514; H01R 13/506; H01R 13/6315
(Continued)

(56) References Cited

U.S. PATENT DOCUMENTS 3,728,468 A 4/1973 Grauer
5,125,854 A * 6/1992 Bassler ................ H01R 13/514 439/640
(Continued)

FOREIGN PATENT DOCUMENTS

DE 202005007221 U1 9/2006
DE 102007006433 A1 * 8/2008 ....... H01L 31/02013
DE 102015118263 A1 4/2017

*Primary Examiner* — Marcus E Harcum

(74) *Attorney, Agent, or Firm* — LEYDIG, VOIT & MAYER, LTD.

(57) ABSTRACT

An assembly of a plug-in connector part includes: a holding frame having a receiving space for receiving at least one contact insert and which has at least one flange section; a housing part which has a receiving opening into which the holding frame is insertable in an insertion direction, and which has at least one support section formed in the receiving opening; at least one locking element which is arranged on the holding frame, the at least one locking element, in an inserted position, being in engagement with the housing part to lock the holding frame on the housing part; and at least one spring element which is arranged on the at least one flange section and which, to form an electrical contacting between the holding frame and the housing part, rests on the at least one support section in the inserted position and is brought into a tensioned state.

17 Claims, 7 Drawing Sheets

(51) Int. Cl.
*H01R 13/508* (2006.01)
*H01R 13/639* (2006.01)

(58) Field of Classification Search
USPC .................................................. 439/95, 540.1
See application file for complete search history.

(56) References Cited

U.S. PATENT DOCUMENTS

| | | | | |
|---|---|---|---|---|
| 6,089,882 | A * | 7/2000 | Costello | H05K 5/0269 439/95 |
| 6,456,504 | B1 * | 9/2002 | LoForte | H05K 5/0269 439/95 |
| 7,048,550 | B2 * | 5/2006 | Hyland | H01R 31/005 439/67 |
| 7,744,384 | B2 * | 6/2010 | Wu | H05K 1/0215 439/95 |
| 10,424,892 | B2 * | 9/2019 | Herbrechtsmeier | H01R 13/639 |
| 11,482,819 | B2 * | 10/2022 | Kliever | H01R 13/518 |
| 2008/0092604 | A1 * | 4/2008 | Trinh | H05K 7/1474 70/57 |
| 2009/0258530 | A1 * | 10/2009 | Nehm | H01R 13/62955 439/372 |
| 2015/0079814 | A1 * | 3/2015 | Tamai | H01R 12/91 439/55 |
| 2015/0079834 | A1 * | 3/2015 | Wu | H01R 13/6591 439/607.54 |
| 2016/0249476 | A1 * | 8/2016 | Rohmer | H01R 13/518 |
| 2017/0077640 | A1 * | 3/2017 | Diessel | H01R 13/508 |
| 2018/0115103 | A1 * | 4/2018 | Schlegel | H01R 13/514 |
| 2018/0309227 | A1 | 10/2018 | Diessel et al. | |
| 2020/0295500 | A1 * | 9/2020 | Tiemann | H01R 13/518 |

* cited by examiner

ASSEMBLY OF A PLUG-IN CONNECTOR PART, PLUG-IN CONNECTOR PART AND ELECTRONIC DEVICE

CROSS-REFERENCE TO PRIOR APPLICATIONS

This application is a U.S. National Phase application under 35 U.S.C. § 371 of International Application No. PCT/EP2021/053179, filed on Feb. 10, 2021, and claims benefit to German Patent Application No. DE 10 2020 103 845.3, filed on Feb. 14, 2020. The International Application was published in German on Aug. 19, 2021 as WO/2021/160657 under PCT Article 21(2).

FIELD

The present disclosure relates to an assembly of a plug-in connector part. The present disclosure further relates to such a plug-in connector part and an electronic device.

BACKGROUND

Holding frames of such assemblies serve for modular use and holding of contact inserts at plug-in connector parts. One or more contact inserts may be arranged on such a holding frame in order to be introduced, together with the holding frame, into a housing or into a housing part of the housing of a plug-in connector part and be connected to the housing or housing part. In this way, contact inserts can be combined with one another in a modular manner and arranged in or on a plug connector part via the holding frame.

Such contact inserts can, for example, have one or more electrical contacts. In this case, the contact inserts on the one hand are connected to electrical lines, which are routed to a plug connector, and on the other hand form plug contacts via which the plug connector can be brought into plug-in engagement with a mating plug connector part for electrical contact.

Such modular contact inserts offer the advantage of flexible combination capability and variable usability of plug connectors.

In the case of a holding frame known from DE 10 2012 110 907 A1, it is provided that a second holding frame part may be attached to a first holding frame part, which has recesses for receiving projection elements of the contact inserts, in order in this way to lock projection elements inserted into the recesses and thus secure them on the holding frame.

In the case of a fastening insert for a plug-in connector, known from DE 20 2005 007 221 U1, a mounting frame on which a contact insert is arranged is insertable for fixing into a receiving opening of a device housing. The mounting frame consists at least partially of an electrically conductive material in order to establish an electrically conductive connection of the contact insert to the device housing. In an inserted position, the mounting frame is latched onto the device housing via a plurality of latching elements.

Conventionally, a holding frame for receiving modular contact inserts is often screwed to a housing part into which the holding frame is to be inserted. Although this ensures a mechanically fixed, reliably durable connection, it requires a comparatively complicated assembly process because, to connect the holding frame to an associated housing part, the holding frame is initially inserted into the housing part and then screwed to the housing part by installing threaded connections.

SUMMARY

In an embodiment, the present disclosure provides an assembly of a plug-in connector part, comprising: a holding frame which has a receiving space configured to receive at least one contact insert and which has at least one flange section; a housing part which has a receiving opening into which the holding frame is insertable in an insertion direction, and which has at least one support section formed in the receiving opening; at least one locking element which is arranged on the holding frame, the at least one locking element, in an inserted position, being in engagement with the housing part to lock the holding frame on the housing part; and at least one spring element which is arranged on the at least one flange section and which, to form an electrical contacting between the holding frame and the housing part, is configured to rest on the at least one support section in the inserted position and to be brought into a tensioned state.

BRIEF DESCRIPTION OF THE DRAWINGS

The present disclosure will be described in even greater detail below based on the exemplary figures. The disclosure is not limited to the exemplary embodiments. Other features and advantages of various embodiments of the present disclosure will become apparent by reading the following detailed description with reference to the attached drawings which illustrate the following.

DETAILED DESCRIPTION

Figure 1:
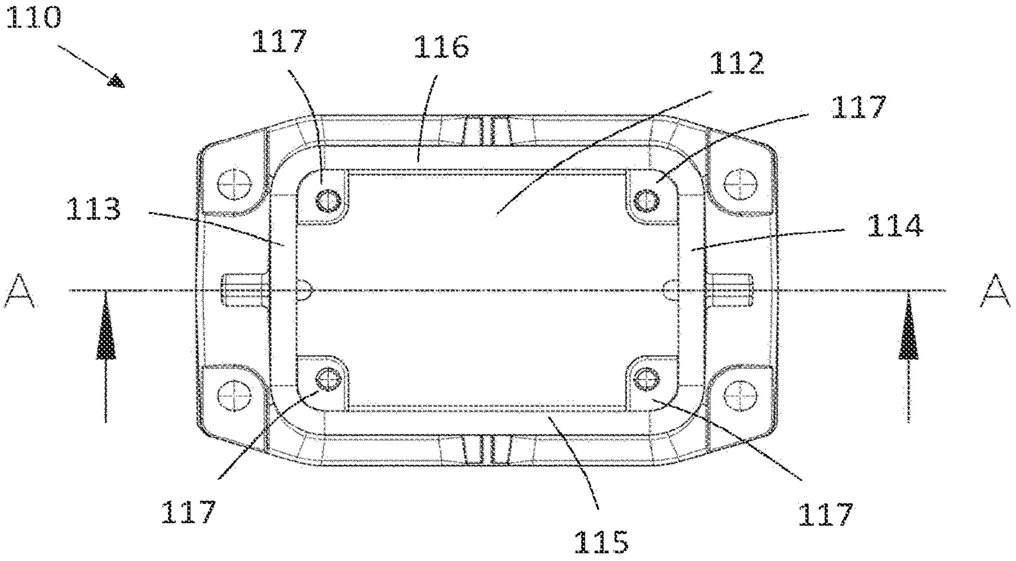
FIG. 1 is a schematic representation of a housing part from above, in plan view.

According to an aspect of the present disclosure, an assembly, a plug-in connector part, and an electronic device, are provided with which the connection of a holding frame to a housing part may be simplified.

The assembly according to an aspect of the present disclosure has a holding frame which has a receiving space for receiving at least one contact insert, and which has at least one flange section. Furthermore, the assembly has a housing part which has a receiving opening into which the holding frame can be inserted in an insertion direction, and the housing part has at least one support section formed in the receiving opening. Furthermore, at least one locking element is provided which is arranged on the holding frame, wherein the locking element, in an inserted position, is in engagement with the housing part in order to lock the holding frame to the housing part. In addition, at least one spring element is provided which is arranged on the at least one flange section and which, in the inserted position, rests on the at least one support section and is transferred into a tensioned state to form an electrical contact between the holding frame and the housing part.

According to an aspect of the present disclosure, it is provided that, to mechanically and electrically connect the holding frame to the housing part, at least one spring element is provided, and thus a threaded connection is no longer provided. The spring element is characterized by a resilient behavior. The spring element is preferably formed from an electrically conductive material, such as a metal. Upon inserting the holding frame into the housing part, the at least one spring element may first be tensioned before the actual fastening, in particular latching, of the holding frame to the housing part may take place via the locking element. This enables a direct latching of the holding frame to the housing part. Via the locking element, a positive connection between the holding frame and the housing part may be established when the holding frame is inserted into the receiving opening of the housing part. The locking element may thereby be designed in such a way that, upon insertion of the holding frame into the receiving opening of the housing part, the locking between the holding frame and the housing part is automatically established. However, a non-automatic locking, but for example a manual locking, is also possible. A secure, reliable connection between the holding frame and the housing part may be achieved via an in particular form-fitting engagement of the locking element into the housing part, which connection may be released without additional measures by unlocking the locking element. The production of threaded connections may thus be dispensed with, so that the connection between the holding frame and the housing part may be established in a simple manner. To connect the holding frame to the housing part, the holding frame is inserted along an insertion direction into the receiving opening of the housing part, so that the holding frame with the at least one spring element arranged on the at least one flange section may come into contact with one or more support sections of the housing part. In the inserted position, the holding frame thus rests on the one or more support sections so that the holding frame, viewed axially along the insertion direction, may arrive at a defined position within the housing part. The housing part may be formed from a metal, so that the housing part may be, for example, a zinc die-cast part or an aluminum die-cast part. The housing part may also be formed only partially from a metal and partially from a plastic material, wherein a metal material is then provided in particular in the region of the at least one support section, said metal material, in the inserted position, being in electrical contact with the spring element arranged on the flange section of the holding frame and resting on the support section. Due to the tensioned state of the spring element in this contacting position with the support section, a secure contacting between the holding frame and the housing part may be formed at any time, since relative movements between the housing part and the holding frame in the inserted position may be compensated for via the spring element. In addition, the mechanical locking of the holding frame to the housing part via the locking element may also be improved via the at least one spring element, since the locking element may be brought, in particular pressed, into a particularly secure engagement with the housing part via the tensioning force of the at least one spring element. The holding frame preferably has two flange sections, wherein two spring elements and one locking element are preferably arranged on each flange section, wherein the housing part then has four support sections on which rest in each case one of the four spring elements in the inserted position.

The spring element preferably has a free end section which, in a relaxed state of the spring element, may extend at an angle of $10° \leq \alpha \leq 40°$ relative to the flange section of the holding frame. The free end section of the spring element may thus extend in a relaxed state, and thus in the non-tensioned state, at an angle to the flange section on which the spring element is arranged or fastened. Due to this angular arrangement of the free end section of the spring element, the spring element may be tensioned upon insertion of the holding frame into the housing part, and thus upon the spring element meeting the support section of the housing part. If, upon insertion of the holding frame into the housing part, the spring element with its free end section strikes against the support section, a pivoting movement of this free end section takes place in the direction of the flange section, whereby a tension may be generated in the spring element. In the tensioned state, the free end section of the spring element is preferably oriented parallel to the flange section of the holding frame. The free end section may be designed in the form of a spring tab or a leg. The free end section may be connected to a fastening section of the spring element, wherein the spring element may be held and fastened, via its fastening section, on the flange section of the holding frame. The fastening section may, for example, be U-shaped so that the fastening section of the spring element may encompass the flange section of the holding frame. Both the free end section and the fastening section are preferably formed flat.

The spring element may be curved in an S-shape. The free end section, together with the fastening section, may form an S-shape. Via the S-shape, a compact design of the spring element with simultaneously good spring properties is possible.

For example, the spring element may be a stamped bent part, whereby a cost-reduced production of the spring element is possible. The spring element may be stamped out of a sheet metal strip and bent into the desired shape in order in particular to form the free end section and the fastening section.

The spring element is preferably formed from a spring-elastic, electrically conductive material.

The fastening of the spring element to the flange section may take place by means of a latching connection. For example, a latching tab or latching lug, which may engage in a recess or opening formed on the flange section, may be formed on the spring element. The latching tab or latching lug may be formed on the fastening section of the spring element. A simple mounting of the spring element onto the holding frame may be enabled via the latching connection. In addition, the spring element may be easily removed and replaced.

At least one recess is preferably formed on the housing part, in which recess the locking element may engage at least in regions in the inserted position. The locking element may positively engage in the recess with at least a section of the locking element. Upon insertion of the holding frame into the housing part in the insertion direction, the locking element may automatically snap into the recess of the housing part, whereby a latching connection may be formed between the holding frame and the housing part. The number of recesses in the housing part preferably corresponds to the number of locking elements, so that one recess may be associated with each locking element. The one or more recesses are preferably formed on one or both end walls of the housing part, wherein the recesses are formed on the inner surfaces of the end walls facing in the direction of the receiving opening. The recesses may in each case be trough-shaped.

The locking element is preferably designed such that it may be disengaged from the housing part again in order to be able to release the locking of the holding frame with the housing part. This may preferably take place with the aid of a tool, such as a screwdriver. For this purpose, the locking element may have a tool receiving region in which the tool may engage in order to bring the locking element from a locked position into an unlocked position. The tool receiving region is preferably formed centrally along the length of the locking element. The tool receiving region may have a free space in which the tool may engage. The tool receiving region may be designed in the form of a tab formed or molded on the locking element.

The locking element may be designed in the form of a wire body. The locking element may be formed, in particular be bent, from a round wire. The locking element designed as a wire body may have the shape of a bow.

Furthermore, it is possible for the locking element be formed from a sheet metal strip. The locking element then preferably has a design that is flat at least in regions.

Furthermore, it is possible for the locking element to be formed from a displaceably mounted latching element and an actuating lever, wherein the latching element may be brought by means of the actuating lever into a locked position and into an unlocked position. A tool is then no longer necessary to release the locking element from the latching position with the housing part, since this may take place directly via the actuating lever. The latching element is mounted so as to be displaceable in the housing part, preferably transversely to the insertion direction of the holding frame, in order to be able to engage and disengage with the housing part. The actuating lever is preferably pivotably mounted in such a way that, given a pivoting movement of the actuating lever about a pivot axle, an axial or translational movement of the latching element takes place.

The at least one locking element and the at least one spring element may be formed from components that are separate from one another. The locking element and the spring element may then be arranged and mounted separately from one another on the holding frame, in particular on the flange section of the holding frame. Two spring elements are preferably associated with each locking element, so that a locking element and two spring elements are in each case arranged on the two flange sections of the holding frame.

Alternatively, it is also possible for the at least one locking element and the at least one spring element to be designed in the form of a single-piece component. The single-piece component then preferably forms a locking element and two spring elements, wherein this single-piece component may be arranged on the flange section of the holding frame. Such a single-piece component may, for example, be stamped from a sheet metal strip and bent.

In both the single-piece embodiment and a separate embodiment of the locking element and the spring elements, the locking element is preferably arranged in each case between two spring elements.

Another aspect of the present disclosure provides a plug-in connector part of a plug-in connector which has a designed and developed assembly as described above, and at least one contact insert inserted into the receiving space of the holding frame. The contact inserts may be inserted in a modular manner into the holding frame so that the contact inserts may be combined with one another in any desired manner. The contact inserts may in each case have one or more contacts so that, by combining the contact inserts, a plug face may be achieved to which an associated mating plug-in connector part may be attached in a corresponding manner in order to provide an electrical contact.

Another aspect of the present disclosure provides an electronic device which may have at least one assembly designed and developed as described above, and/or at least one plug-in connector part designed and developed as described above.

Figure 2:
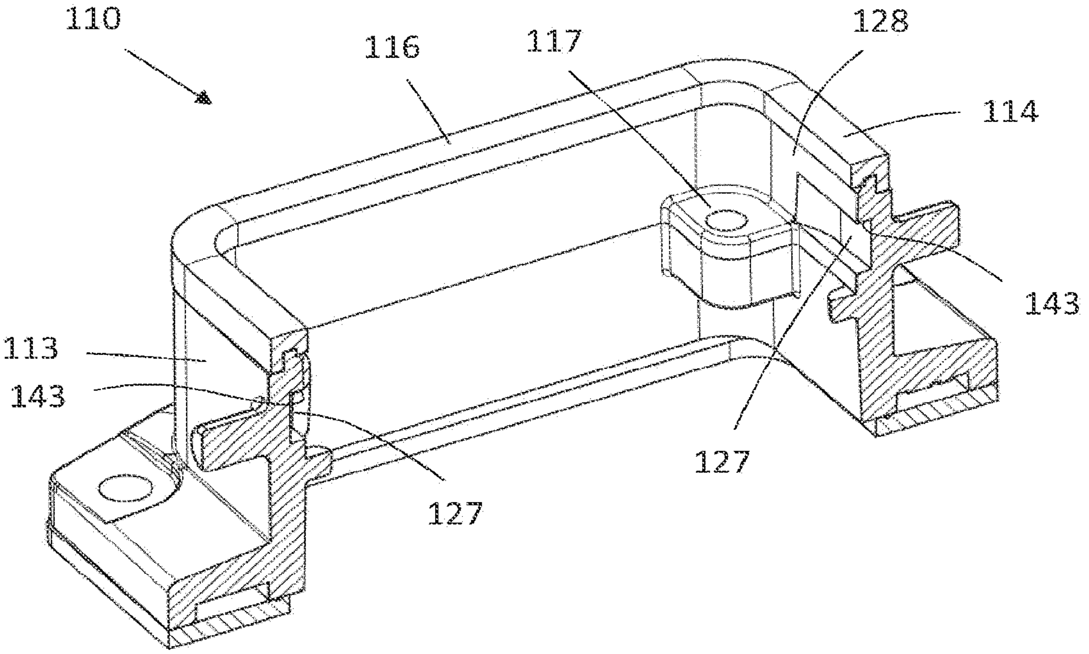
FIG. 2 is a schematic sectional representation of the housing part shown in FIG. 1.
Figure 3:
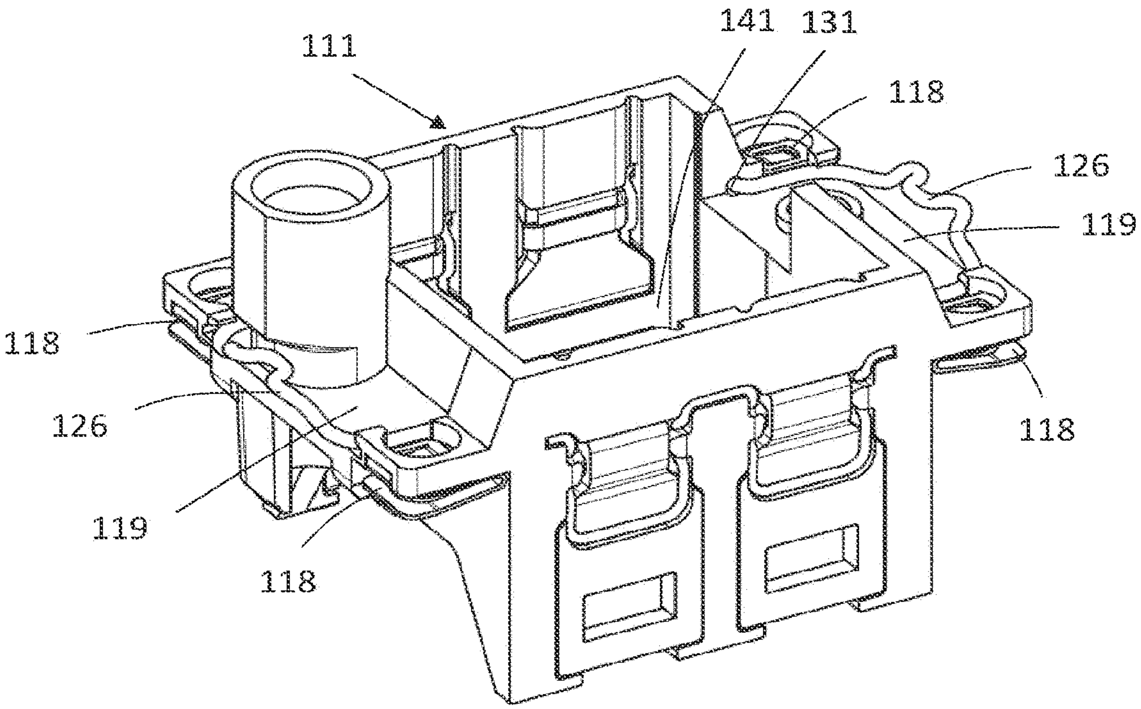
FIG. 3 is a schematic representation of a holding frame with locking elements and spring elements arranged thereon.
Figure 7:
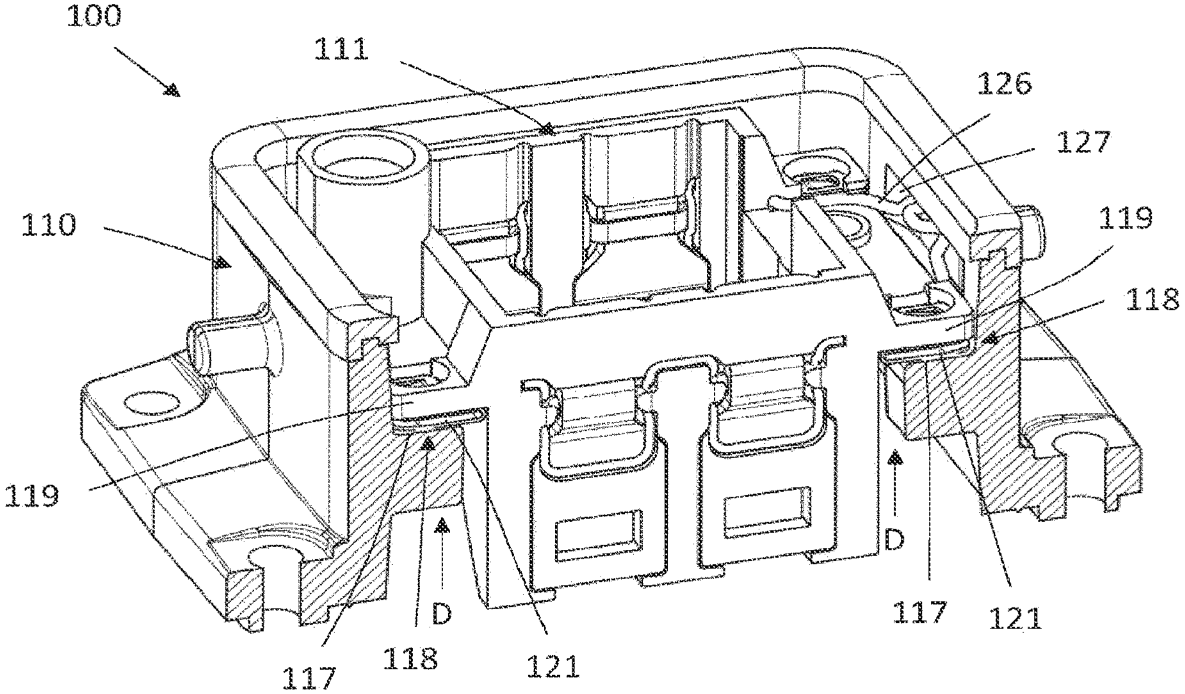
FIG. 7 is a schematic representation of the assembly shown in FIG. 6 in the inserted position of the holding frame in the housing part.
Figure 8:
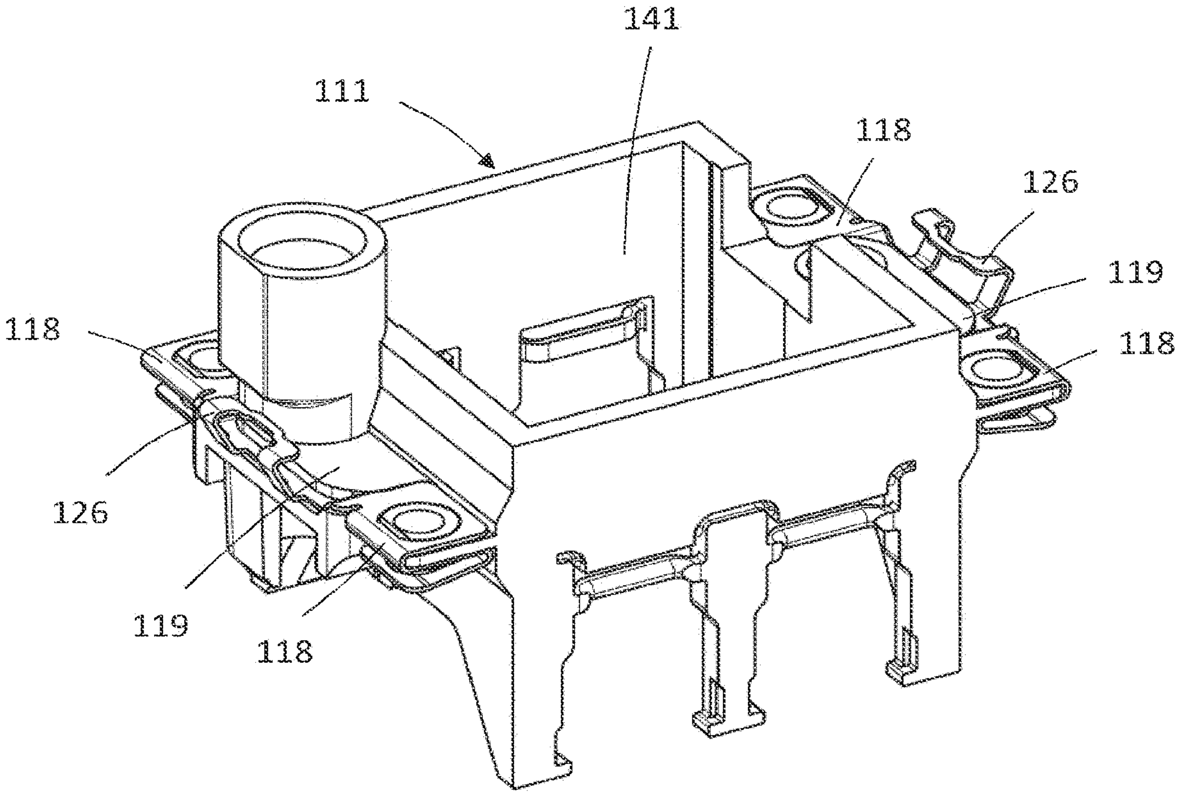
FIG. 8 is a schematic representation of a further holding frame with locking elements and spring elements arranged thereon.
Figure 9:
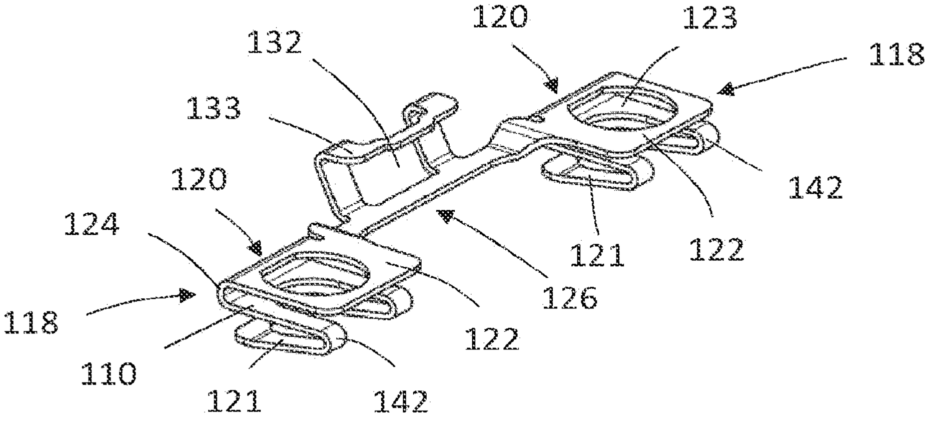
FIG. 9 is a schematic representation of a locking element having two spring elements, designed as a single-piece component.
Figure 10:
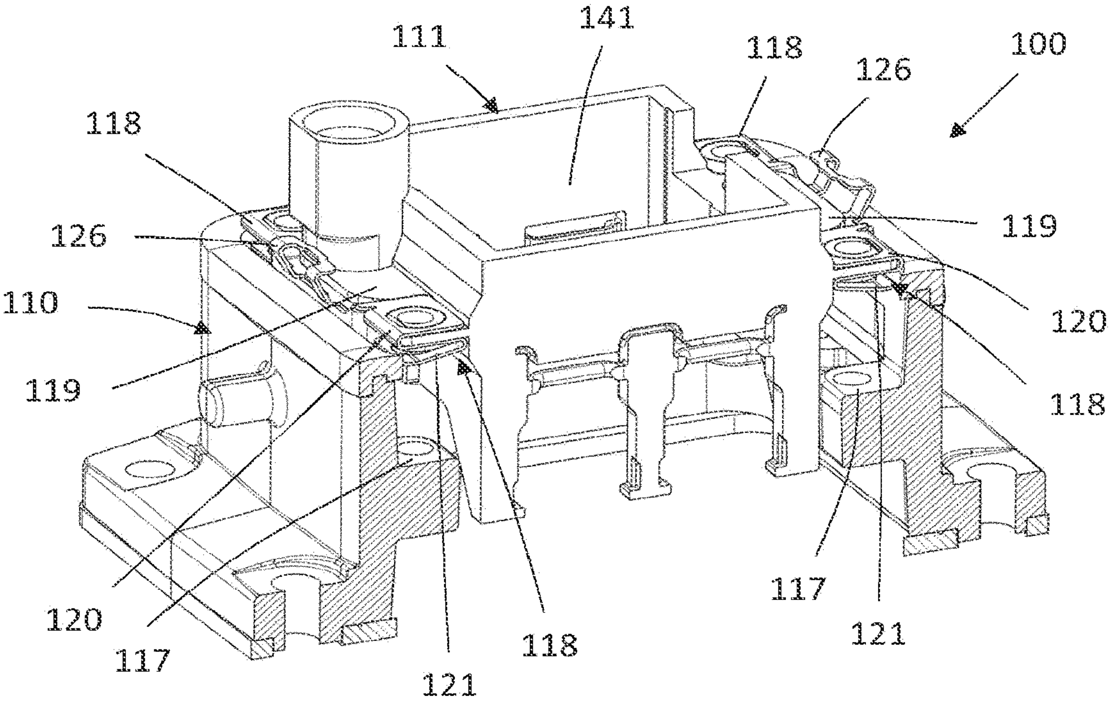
FIG. 10 is a schematic representation of a further assembly according to an aspect of the present disclosure upon insertion of the holding frame shown in FIG. 8 into a housing part as shown in FIG. 1.

FIG. 1 shows a housing part 110 into which a holding frame 111, for example as shown in FIG. 3, may be inserted in order to form an assembly 100 as it is shown in FIG. 7. FIG. 2 shows the housing part 110 depicted in FIG. 1 in a sectional view along the line A-A shown in FIG. 1.

The housing part 110 has a receiving opening 112 into which the holding frame 111 may be inserted in an insertion direction E so that, in the inserted position, for example as shown in FIG. 7, the holding frame 111 is circumferentially enclosed by the housing part 110. The receiving opening 112 is delimited by two opposing end walls 113, 114 and two opposing longitudinal side walls 115, 116. The end walls 113, 114 are arranged at right angles to the longitudinal side walls 115, 116.

Here, formed within the receiving opening 112 are four support sections 117 on which the holding frame 111 rests in the inserted position. The four support sections 117 are formed at the four corners of the receiving opening 112 so that each support section 117 is connected to one of the end walls 113, 114 and to one of the longitudinal side walls 115, 116 of the housing part 110. The support sections 117 are formed at least in regions from an electrically conductive material, such as a metal, so that an electrical contact between the housing part 110 and the holding frame 111 may be formed via the support sections 117. If the holding frame 111 is at a ground potential, the housing part 110 will thereby be likewise connected to the ground potential, whereby a PE contact may be formed.

In order to form this PE contact, spring elements 118 are arranged on the holding frame 111, which spring elements 118 are formed from an electrically conductive material and, in the inserted position of the holding frame 111 in the housing part 110, rest on the support sections 117. As is apparent in FIG. 3, four spring elements 118 are arranged on the holding frame 111 so that one spring element 118 may be associated with each support section 117 of the housing part 110.

The holding frame 111 has two laterally formed flange sections 119 at which the spring elements 118 are held and fastened. Two respective spring elements 118 are arranged on each of the two flange sections 119. In the inserted position, the holding frame 111 rests with the spring elements 118 on the support sections 117 of the housing part 110.

Figure 4:
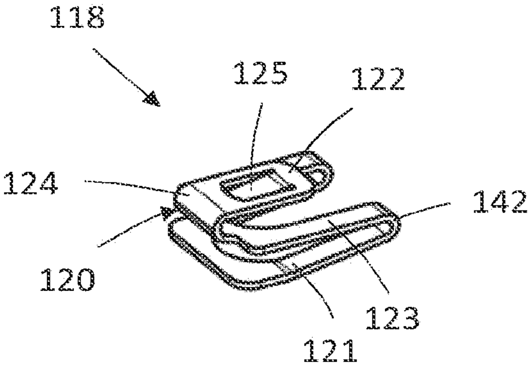
FIG. 4 is a schematic representation of a spring element as shown in FIG. 3.
Figure 5:
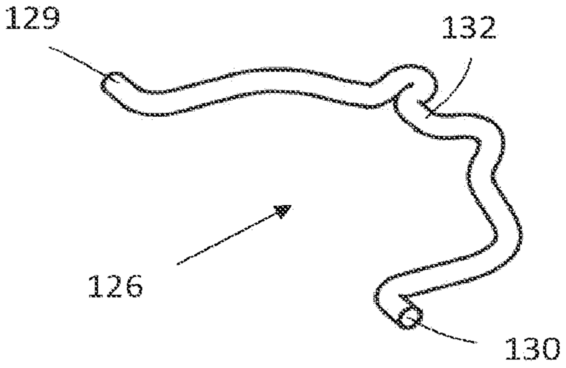
FIG. 5 is a schematic representation of a locking element as shown in FIG. 3.

The spring element 118 is shown separately in FIG. 4. Here the spring element 118 is designed in the form of a stamped bent part. The spring element 118 is stamped from a sheet metal strip and bent into the desired shape.

The spring element 118 has a fastening section 120 and a free end section 121 adjoining the fastening section 120. The fastening section 120 is formed or bent, together with the free end section 121, in such a way that the spring element 118 has an S-shape.

The spring element 118 is mounted and fastened to the flange section 119 of the holding frame 111 via the fastening section 120. The fastening section 120 is curved in a U-shape. The mounting section 120 has a first leg 122 and a second leg 123, wherein the first leg 122 and the second leg 123 are connected to one another via an arcuate section 124. The first section 122 and the second section 123 run substantially parallel to one another. The arcuate section 124 forms a 180° bend.

A latching tab 125, via which a latching connection between the spring element 118 and the flange section 119 may be formed, is formed on the fastening section 120. The latching tab 125 is formed on the first leg 122. The latching tab 125 is cut out of the material of the first leg 122. The latching tab 125 is cut out in such a way that it is aligned in the direction of the second leg 123. The latching tab 125 is formed approximately in the center of the first leg 122.

The free end section 121 is connected to the fastening section 120 via a further arcuate section 142. The free end section 121 directly adjoins the second leg 123 of the fastening section 120. The free end section 121 forms a spring tab. The free end section 121 forms a third leg of the spring element 118. The free end section 121 is approximately of the same length and of the same width as the second leg 123 of the fastening section 120. FIG. 4 shows the spring element 118 in a relaxed state, in which the free end section 121 extends at an angle of $10° \leq \alpha \leq 40°$ relative to the flange section 119 of the holding frame 111 and also relative to the second leg 123. By contrast, the first leg 122 and the second leg 123 of the fastening section 120 extend parallel to the flange section 119 of the holding frame 111, and thus parallel to one another, both in the relaxed state and in the tensioned state of the spring element 118.

In addition to the spring elements 118, in each case a locking element 126 is arranged on the two flange sections 119, via which locking element 126 a fastening and in particular a locking of the holding frame 111 to the housing part 110 may be formed in the inserted position. In each case a locking element 126 is arranged between two spring elements 118, as is apparent in FIG. 3. In order to establish a latching, in the inserted position the two locking elements 126 are in engagement with the housing part 110, as is shown in FIG. 7.

For this purpose, in each case a recess 127 is formed in the two end side walls 113, 114 of the housing part 110, in which recess the locking elements 126 may engage in the inserted position. The two recesses 127 are formed in the inner surface 128 of the end walls 113, 114, said inner surface facing in the direction of the receiving opening 112, as is in particular also apparent in the sectional view of FIG. 2. The two recesses 127 are arranged opposite one another.

In the embodiment shown in FIGS. 3 to 7, the locking element 126 is designed in the form of a wire body, in particular a round wire. The locking element 126 is fastened to the holding frame 111 via its two free ends 129, 130. For this purpose, openings 131 are formed in the holding frame 111, into which openings the free ends 129, 130 of the locking element 126 are inserted, for example as is apparent in FIG. 3. Via the insertion fastening of the two locking elements 126 in the openings 131, the locking elements 126 are mounted so as to be pivotable relative to the holding frame 111, in particular relative to the flange sections 119 of the holding frame 111, so that the locking elements 126 may be pivoted into the recesses 127 in the housing part 110.

The locking elements 126 have a tool receiving region 132 in which a tool may be received or hooked in order to release the respective locking element 126 from the locked position again, in which locked position the locking element 126 engages in the recess 127, and to bring it into the unlocked position. The locking element 126 is formed curved substantially in a U-shape at the tool receiving region 132. The tool receiving region 132 is formed approximately in the center of the length of the locking element 126.

In the embodiment shown in FIGS. 3 to 7, the locking elements 126 and the spring elements 118 are in each case designed as components separate from one another.

Figure 6:
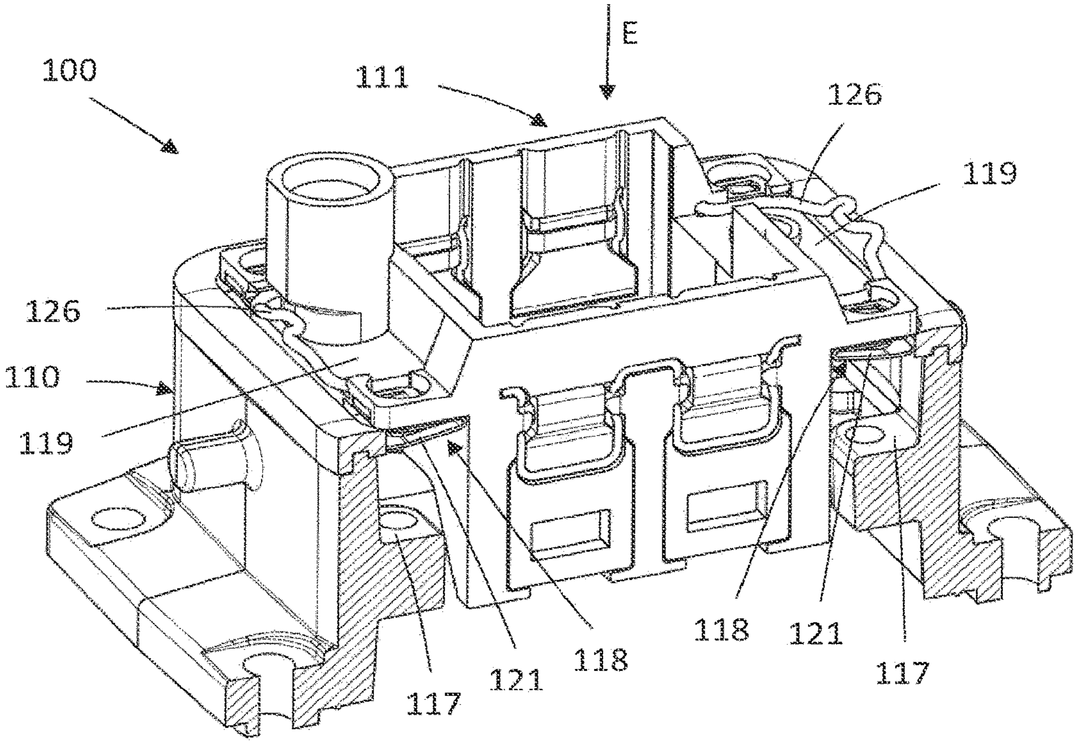
FIG. 6 is a schematic representation of an assembly according to an aspect of the present disclosure upon insertion of the holding frame shown in FIG. 3 into a housing part as shown in FIG. 1.

FIG. 6 shows the assembly 100 upon insertion of the holding frame 111 shown in FIG. 3 into the receiving opening 112 of the housing part 110, wherein the holding frame 111, together with the locking elements 126 and spring elements 118 fastened to the holding frame 111, is inserted into the housing part 110 in the insertion direction E. The holding frame 111 is inserted into the receiving opening 112 of the housing part 110 until the two flange sections 119 of the holding frame 111 come to rest on the receiving sections 117 of the housing part 110, via the spring elements 118 arranged on said flange sections 119. Since the spring elements 118, with their free end sections 121, project from the flange sections 119 and are inclined in the direction of the receiving sections 117, the spring elements 118 come into contact with the support sections 117. Due to the contact of the free end sections 121 with the support sections 117, the free end sections 121 are bent in the direction of the respective flange section 119 given a further insertion of the holding frame 111 in the insertion direction E, whereby the spring elements 118 are tensioned and thus, also in the inserted position as it is shown in FIG. 7, the spring elements 118 may at any time form a secure abutment on the support sections 117, and thus secure contacting, in particular a secure PE contacting, between the housing section 110 and the holding frame 111. In the tensioned state as is shown in FIG. 7, the free end section 121 of the spring elements 118 is aligned parallel to the respective flange section 119.

Upon insertion of the holding frame 111 into the receiving opening 112 of the housing part 110, the two locking elements 126 may automatically snap into the respective recess 127, so that in the inserted position the locking elements 126 engage in the recesses 127, as is shown in FIG. 7.

A further possible embodiment of an assembly 100 is shown in FIGS. 8 to 11.

The spring elements 118 here have essentially the same design as the spring elements 118 shown in FIGS. 3 to 7, wherein, however, the spring elements 118 are formed in one piece with the locking element 126 associated with them in the embodiment shown in FIGS. 8 to 11. Here a locking element 126, together with two spring elements 118, forms a component of single-piece design. Here the locking element 126 is also arranged between two spring elements 118. The locking element 126 is attached to the fastening sections 120 of the spring elements 118, in particular to the first leg 122 of the fastening sections 120. The spring elements 118, with their fastening sections 120, are pushed onto the flange sections 119 of the holding frame 111 so that the spring elements 118 surround the flange sections 119 with their fastening sections 120. The fastening of the locking element 126 to the holding frame 111 takes place here via the two spring elements 118 associated with the respective locking element 126, which spring elements are fastened to a flange section 119 of the holding frame 111.

Figure 11:
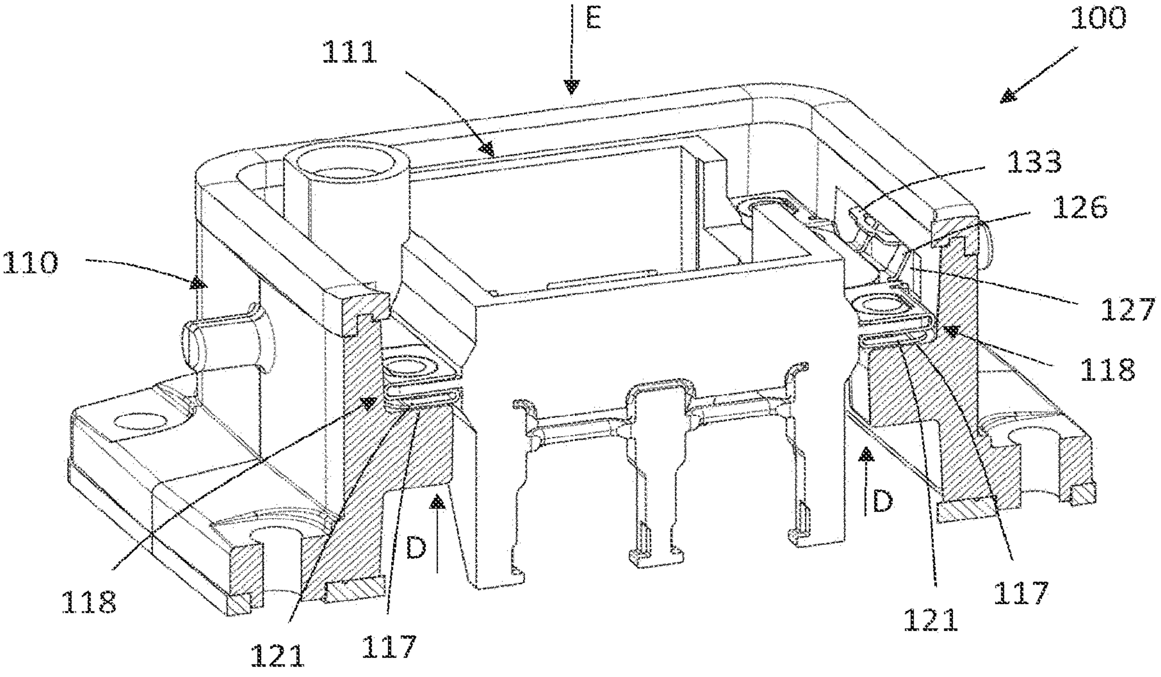
FIG. 11 is a schematic representation of the assembly shown in FIG. 10 in the inserted position of the holding frame in the housing part.

The locking element 126, together with the two spring elements 118 attached to the locking element 126, is stamped from a sheet metal strip and bent. The locking element 126 has a latching tab 133 which, in the inserted position as is shown in FIG. 11, engages in or behind the recess 127 in the housing part 110. A tool receiving region 132 which is designed in the form of a window-like opening in the latching tab 133 is formed on the latching tab 133.

In the embodiment shown in FIGS. 8 to 11, the mode of functioning during insertion of the holding frame 111 into the housing part 110 is identical to that of the embodiment shown in FIGS. 3 to 7, so that reference is made in particular to the statements regarding FIGS. 6 and 7.

Figure 12:
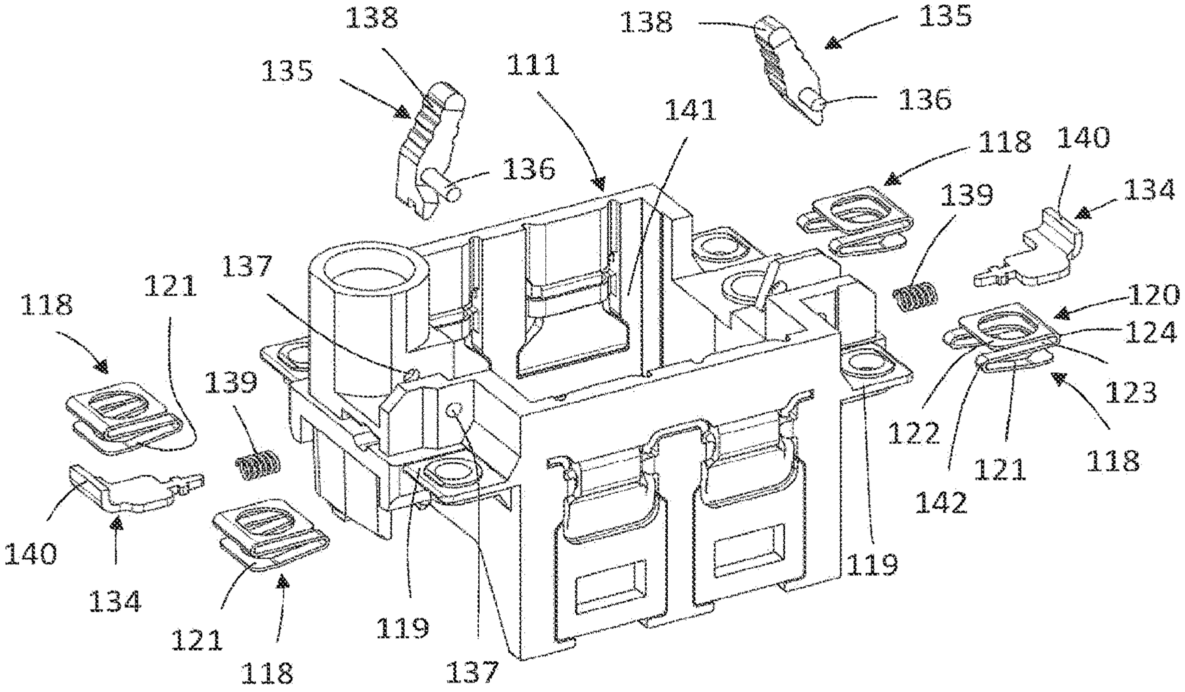
FIG. 12 is a schematic exploded view of a further holding frame with locking elements and spring elements arranged thereon.
Figure 13:
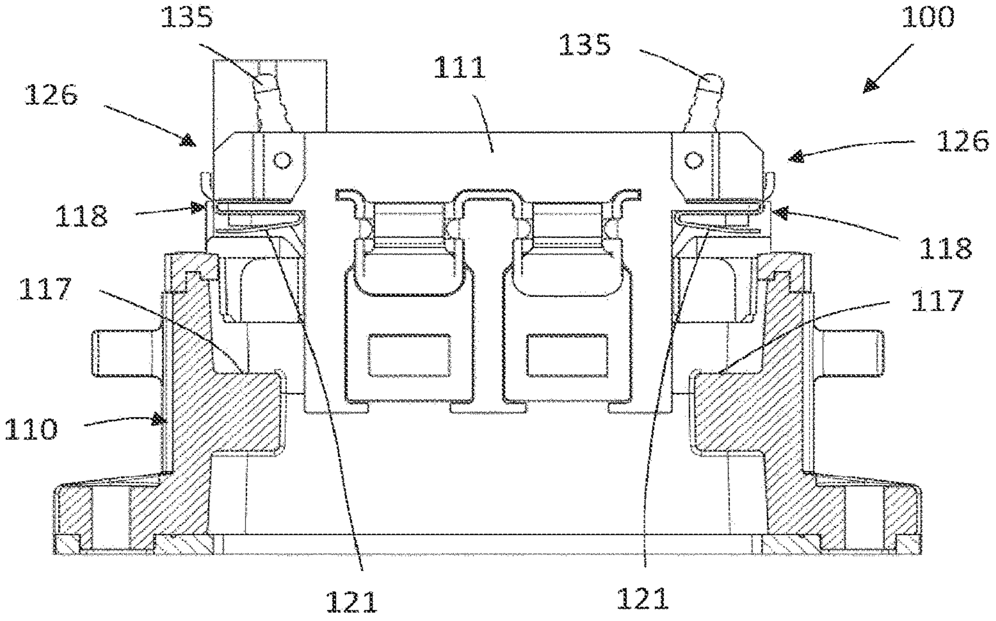
FIG. 13 is a schematic representation of a further assembly according to an aspect of the present disclosure upon insertion of the holding frame shown in FIG. 12 into a housing part as shown in FIG. 1.
Figure 14:
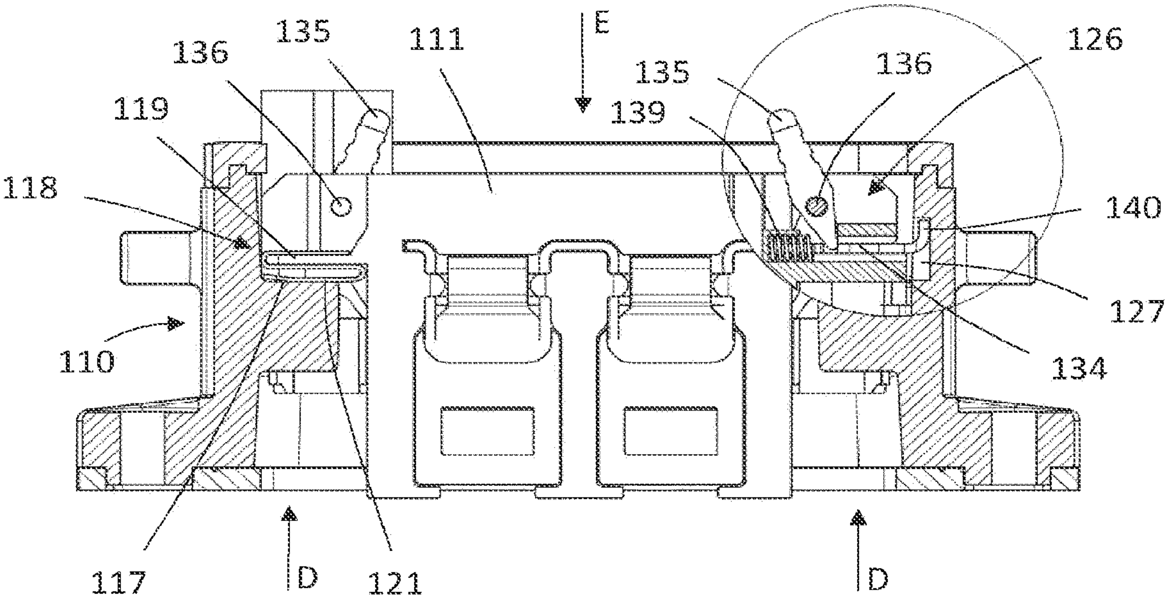
FIG. 14 is a schematic representation of the assembly shown in FIG. 12 in the inserted position of the holding frame in the housing part.

FIGS. 12 to 14 show a further possible embodiment of an assembly 100. In the embodiment shown in FIGS. 12 to 14, the spring elements 118 are identical to the spring elements 118 shown in FIGS. 3 to 7 and the spring elements 118 shown in FIGS. 8 to 11, so that the mode of functioning of the spring elements 118 is the same.

However, the locking elements 126 shown in FIGS. 12 to 14 are in each case formed from a displaceably mounted latching element 134 and an actuating lever 135, wherein the latching element 134 may be brought via the actuating lever 135 at least into an unlocked position. The actuating lever 135 has a pivot axle 136 via which the actuating lever 135 is mounted so as to be pivotable on the holding frame 111. Two openings 137 are provided in the holding frame 111 for each actuating lever 135, in which openings 137 the pivot axle 136 of the actuating lever 135 is rotatably mounted. The actuating lever 135 also has a handle section 138 via which a user may manually actuate the actuating lever 136.

The latching element 134 of the respective locking element 126 is mounted on the holding frame 111 so as to be displaceable transversely to the insertion direction E. A spring element 139 in the form of a spiral spring is arranged between the actuating lever 135 and the latching element 134 of a locking element 126, which spring element may apply a clamping force between the actuating lever 135 and the latching element 134. The latching element 134 has a curved-away latching edge 140 with which the latching element 134 in the inserted position engages in the recess 127 of the housing part 110, as is apparent in FIG. 14. Here, the latching edge 140 is bent away at a 90° angle from the remaining region of the latching element 134.

Upon insertion of the holding frame 111 into the housing part 110 in the insertion direction E, first the spring elements 118 come into contact with the support sections 117 and are tensioned in exactly the same way as in the embodiments shown in FIGS. 3 to 11. As soon as the flange sections 119 of the holding frame 111 also rest on the support sections 117, the latching elements 134 with their latching edge 140 are pushed into the respective recess 127 in the housing part 110 by the spring force of the spring elements 139 and may hook behind there in order to be able to form a fastening, and thus a latching, between the holding frame 111 and the housing part 110 in the inserted position. This latching is releasable again via a manual pivoting movement of the actuating levers 135.

In all embodiments shown here in FIGS. 1 to 14, the spring elements 118 form both an electrical contacting, in particular a PE contacting, between the holding frame 111 and the housing part 110, and, in the inserted position, they simultaneously exert at least one compressive force D on the locking elements 126 in order to be able to hold said locking elements securely in the respective recess 127 so that no unintentional release of the holding frame 111 from the housing part 110 may take place. The pressure force D applied by the tensioned spring elements 118 thereby acts counter to the insertion direction E, whereby the locking elements 126 are pressed against an upper edge 143 of the respective recess 127 of the housing part 110.

All holding frames 111 shown here have a receiving space 141 into which preferably a plurality of contact inserts may be inserted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Assembly
110 Housing part
111 Holding frame
112 Receiving opening
113 End wall
114 End wall
115 Longitudinal side wall
116 Longitudinal side wall
117 Receiving section
118 Spring element

119 Flange section
120 Fastening section
121 Free end section
122 First leg
123 Second leg
124 Arcuate section
125 Latching tab
126 Locking element
127 Recess
128 Inner surface
129 Free end
130 Free end
131 Opening
132 Tool receiving region
133 Latching tab
134 Latching element
135 Actuating lever
136 Pivot axle
137 Opening
138 Grip section
139 Spring element
140 Latching edge
141 Receiving space
142 Arcuate section
143 Upper edge
E Insertion direction
D Compressive force

The invention claimed is:

1. An assembly of a plug-in connector part, comprising:

a holding frame which has a receiving space configured to receive at least one contact insert and which has at least one flange section;

a housing part which has a receiving opening into which the holding frame is insertable in an insertion direction, and which has at least one support section formed in the receiving opening;

at least one locking element which is arranged on the holding frame, the at least one locking element, in an inserted position, being in engagement with the housing part to lock the holding frame on the housing part; and at least one spring element which is arranged on the at least one flange section and which, to form an electrical contacting between the holding frame and the housing part, is configured to rest on the at least one support section in the inserted position and to be brought into a tensioned state.

2. The assembly of claim 1, wherein the at least one spring element has a free end section which, in a relaxed state of the at least one spring element, extends at an angle of $10° \leq \alpha \leq 40°$ relative to the flange section.

3. The assembly of claim 1, wherein the at least one spring element comprises an S-shaped curve.

4. The assembly of claim 1, wherein the at least one spring element comprises a stamped bent part.

5. The assembly of claim 1, wherein the at least one spring element comprises a spring-elastic, electrically conductive material.

6. The assembly of claim 1, wherein the at least one spring element is fastened to the flange section by a latch connection.

7. The assembly of claim 1, wherein at least one recess is formed in the housing part, into which in the inserted position the locking element is configured to engage at least in regions.

8. The assembly of claim 1, wherein the at least one locking element has a tool receiving region configured to bring the at least one locking element from a locked position into an unlocked position.

9. The assembly of claim 1, wherein the at least one locking element comprises a wire body.

10. The assembly of claim 1, wherein the at least one locking element comprises a sheet metal strip.

11. The assembly of claim 1, wherein the at least one locking element comprises a displaceably mounted latching element and an actuating lever, and wherein the latching element is configured to be brought into a locked position and into an unlocked position by the actuating lever.

12. The assembly of claim 1, wherein the at least one locking element and the at least one spring element comprise components that are separate from one another.

13. The assembly of claim 1, wherein the at least one locking element and the at least one spring element each comprise a single-piece component.

14. An electronic device, comprising:

at least one assembly of claim 1.

15. An electronic device, comprising:

at least one plug-in connector part of claim 1.

16. The assembly of claim 1, wherein the at least one spring element has a first end and a second end opposite the first end, wherein the first end bears against the at least one flange section, and wherein the second end is a free end that abuts against the at least one support section in the inserted position.

17. The assembly of claim 16, wherein, in the inserted position, the second end is arranged between the at least one flange section and the at least one support section in the insertion direction.

* * * * *